United States Patent
Cha et al.

(10) Patent No.: US 11,712,694 B2
(45) Date of Patent: Aug. 1, 2023

(54) IN-SITU SALINITY AND IONIC CONCENTRATION CONTROL FOR CALCITE COATED MICROFLUIDIC CELL

(71) Applicant: SAUDI ARABIAN OIL COMPANY, Dhahran (SA)

(72) Inventors: Dong Kyu Cha, Dhahran (SA); Subhash C. Ayirala, Dhahran (SA); Ahmed Gmira, Al-Khobar (SA); Ali Abdallah Al-Yousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 402 days.

(21) Appl. No.: 16/924,817

(22) Filed: Jul. 9, 2020

(65) Prior Publication Data

US 2022/0008920 A1    Jan. 13, 2022

(51) Int. Cl.
| | | |
|---|---|---|
| *B01L 3/00* | (2006.01) | |
| *B01D 61/08* | (2006.01) | |
| *B01D 61/02* | (2006.01) | |

(52) U.S. Cl.
CPC ........ *B01L 3/502715* (2013.01); *B01D 61/08* (2013.01); *B01L 3/502707* (2013.01); *B01D 61/027* (2013.01); *B01L 2200/027* (2013.01); *B01L 2200/0631* (2013.01); *B01L 2300/0681* (2013.01); *B01L 2300/16* (2013.01)

(58) Field of Classification Search
CPC ........ B01L 3/502715; B01L 3/502707; B01L 2200/027; B01L 2200/0631; B01L 2300/0681; B01L 2300/16; B01D 61/08; B01D 61/027

USPC ........................................ 422/153
See application file for complete search history.

(56) References Cited

U.S. PATENT DOCUMENTS

| | | |
|---|---|---|
| 2010/0175994 A1 | 7/2010 | Lee et al. |
| 2011/0198225 A1 | 8/2011 | Kim et al. |
| 2013/0098839 A1 | 4/2013 | Helm, Jr. |

(Continued)

FOREIGN PATENT DOCUMENTS

| | | |
|---|---|---|
| CN | 206996028 U | 2/2018 |
| KR | 20170062041 A | 6/2017 |

(Continued)

OTHER PUBLICATIONS

Lin, Jiuyang et al., "Fractionation of direct dyes and salts in aqueous solution using loose nanofiltration membranes", Journal of Membrane Sciene, Elsevier B.V., Jan. 2, 2015, pp. 183-193 (11 pages).

(Continued)

*Primary Examiner* — Christine T Mui
(74) *Attorney, Agent, or Firm* — Osha Bergman Watanabe & Burton LLP (57) ABSTRACT

A method includes flowing an inlet solution having an inlet salinity and an inlet ion concentration from an inlet to a membrane filtration system, dynamically adjusting the salinity or ion concentration of the inlet solution in situ as the inlet solution flows to an inlet of a microfluidic cell, and determining a wettability alteration in situ while dynamically adjusting the salinity or ion concentration of the inlet solution. A system includes a fluid inlet, a microfluidic cell fluidly coupled to the fluid inlet, the microfluidic cell having a surface representative of a reservoir rock, and a membrane filtration system coupled between the microfluidic cell and the fluid inlet.

20 Claims, 3 Drawing Sheets

(56) References Cited

U.S. PATENT DOCUMENTS

2014/0041856 A1     2/2014   Janssen et al.
2017/0030819 A1     2/2017   McCarty et al.

FOREIGN PATENT DOCUMENTS

KR     20170082845 A     7/2017
WO     2019204048 A1     10/2019

OTHER PUBLICATIONS

"Nanofiltration Sheet Membrane Products", Product Brochure, Sepro, www.sepromembranes.com, Aug. 3, 2011 (1 page).

Rostami, Peyman et al., "Effect of water salinity on oil/brine interfacial behaviour during low salinity waterflooding: A mechanistic study". Petroleum, Southwest Petroleum Universtiy, Ke Ai Publishing, Elsevier B.V., vol. 5, Mar. 2019, pp. 367-374 (8 pages).

Longeron D et al.; "Water-Oil Capillary Pressure and Wettability Measurements Using Micropore Membrane Technique", SPE 3006, Society of Petroleum Engineers; Nov. 1995 (11 Pages).

Udegbunam, John Emeka; "EOR in Chalk: Optimized Oil Recovery with Modified Seawater. Master's Thesis", Jan. 1, 2011, pp. 1-65; XP055787340; Retrieved from the Internet: URL: https://core.ac.uk/download/pdf/52078299.pdf (65 pages).

International Search Report and Written Opinion issued in Application No. PCT/US2020/045383, dated Mar. 26, 2021 (18 pages).

IN-SITU SALINITY AND IONIC CONCENTRATION CONTROL FOR CALCITE COATED MICROFLUIDIC CELL

BACKGROUND

Oil production have generally been categorized into three phases: primary, secondary, and tertiary. Primary recovery involves hydrocarbons that naturally rise to the surface or pumping hydrocarbons to the surface using artificial lift systems. Secondary recovery involves water and gas injections methods that displace the oil and drive it to the surface. Tertiary recovery is also known as enhanced oil recovery (EOR) and involves restoration of formation pressure and changing properties of the hydrocarbons to improve oil displacement or fluid flow in the reservoir. However, the techniques used during enhanced oil recovery can be used at any time or during any phase of production of an oil reservoir. During EOR, wetting agents may be used to modify the wettability of reservoir rocks to enhance oil production. The wettability of the reservoir rock can be reversed toward oil-wet to release oil capillary trapping or toward water-wet to enhance water imbibition and oil countercurrent production.

Reservoir rocks may be classified based on their wettability. Wettability is the ability of a liquid to maintain contact with a solid surface. A liquid tends to spread on a solid surface whereas a porous solid tends to imbibe the liquid. Thus, reservoir rocks may be classified as water-wet, oil-wet, or mixed-wet. Wettability alteration refers to the process of making the reservoir rock more water-wet. Wettability alteration may be effectively used to enhance oil recovery.

SUMMARY

In one aspect, embodiments disclosed herein relate to methods and apparatus for determining and analyzing a fluid/fluid interaction or a fluid/rock interaction at their interfaces and for determining a wettability alteration.

In one aspect, embodiments disclosed herein relate to a method including introducing an inlet solution having an inlet salinity and an inlet ion concentration from an inlet to a membrane filtration system, passing the inlet solution through a first membrane of the membrane filtration system to provide a first permeate having a first salinity and a first ion concentration, flowing the first permeate into a microfluidic cell, determining a first wettability of a surface of the microfluidic cell associated with the first salinity and the first ion concentration, adjusting the membrane filtration system to move a second membrane into fluid communication with the inlet and the microfluidic cell, passing the inlet solution through the second membrane of the membrane filtration system to provide a second permeate having a second salinity and a second ion concentration, wherein the second salinity is different from the first salinity or the second ion concentration is different from the first ion concentration, determining a second wettability of a surface of the microfluidic cell associated with the second salinity and the second ion concentration, and determining a wettability alteration based on the first wettability and the second wettability.

In another aspect, embodiments disclosed herein relate to a method including flowing an inlet solution having an inlet salinity and an inlet ion concentration from an inlet to a membrane filtration system, dynamically adjusting the salinity or ion concentration of the inlet solution in situ as the inlet solution flows to an inlet of a microfluidic cell, and determining a wettability alteration in situ while dynamically adjusting the salinity or ion concentration of the inlet solution.

In another aspect, embodiments disclosed herein relate to a system including a fluid inlet, a microfluidic cell fluidly coupled to the fluid inlet, the microfluidic cell having a surface representative of a reservoir rock, and a membrane filtration system coupled between the microfluidic cell and the fluid inlet.

Other aspects and advantages of the invention will be apparent from the following description and the appended claims.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. For the sake of continuity, and in the interest of conciseness, same or similar reference characters may be used for same or similar objects in multiple figures.

Embodiments disclosed herein relate to methods and apparatus for determining and analyzing a fluid/fluid interaction or a fluid/calcite rock interaction at their interfaces. Such determinations and analysis may assist in enhance oil recovery operations. Embodiments disclosed herein further relate to methods and apparatus for observing and characterizing the wettability alteration of reservoir rock. Specifically, embodiments disclosed herein provide methods and apparatus for analyzing wettability alteration under in situ, dynamic conditions.

Wettability may affect oil recovery and therefore favorable reservoir alteration and reduction of interfacial tension (IFT) can help move residual oil and improve production. Wettability alteration may be affected by oil composition, brine chemistry, rock surface morphology, temperature, pressure, and saturation history. Enhanced oil recovery methods may include chemical recovery methods. Such chemical recovery methods involve various surfactants, polymers, and low salinity water injections. These chemicals may reduce the IFT or alter the wettability of the reservoir rock.

In accordance with one or more embodiments disclosed herein, the wettability alteration may be observed during dynamically changing conditions of the fluid introduced to the reservoir rock. More specifically, embodiments disclosed herein provide a method and system for observing wettability alteration as the properties of the fluid are changed. For example, ion strength, salinity of a fluid, or both may be varied as wettability alteration is observed, such that the effects of ion strength, salinity, or both on the wettability alteration may be observed.

In accordance with one or more embodiments disclosed herein, a system may include a microfluidic cell that allows for determination of a wettability based on observation and characterization of wettability of a surface of the microfluidic cell and a filtration system that dynamically controls a concentration, such as salinity, and/or ionic strength of the test fluid in situ prior to or during introduction of the test fluid to the microfluidic cell.

A microfluidic cell in accordance with embodiments disclosed herein is a quasi-2D representation of porous media that allows direct visualization of pore-scale fluid flow. A microfluidic cell may mimic an underground reservoir environment for enhanced oil recovery analysis. The microfluidic cell may include a surface representative of a reservoir rock. Such microfluidic cells may be useful for studying "smart water," which is a brine composition used to enhance oil recovery, because the microfluidic cell may provide direct visualization of wettability. The microfluidic cell provides clear visualization of fluid flow in a porous medium with a known microstructure. For example, in some embodiments, microfluidic cells may be patterned with for example vertical posts. In some embodiments, the microfluidic cell or micromodel may be chemically modified so the pore surfaces represent carbonate reservoir rock. For example, to represent calcium carbonate reservoir pores, the inner channels of glass microfluidic devices may be coated with layers of calcium carbonate nanocrystals. The surface may be altered to provide oil-wet conditions using a crude oil aging process. In some embodiments, the surface of microfluidic channels of a microfluidic cell may be altered by in situ growth of a thin layer (1-2 μm) of calcium carbonate ($CaCO_3$) nanocrystals, thereby providing a calcite coated microfluidic cell.

Figure 1:
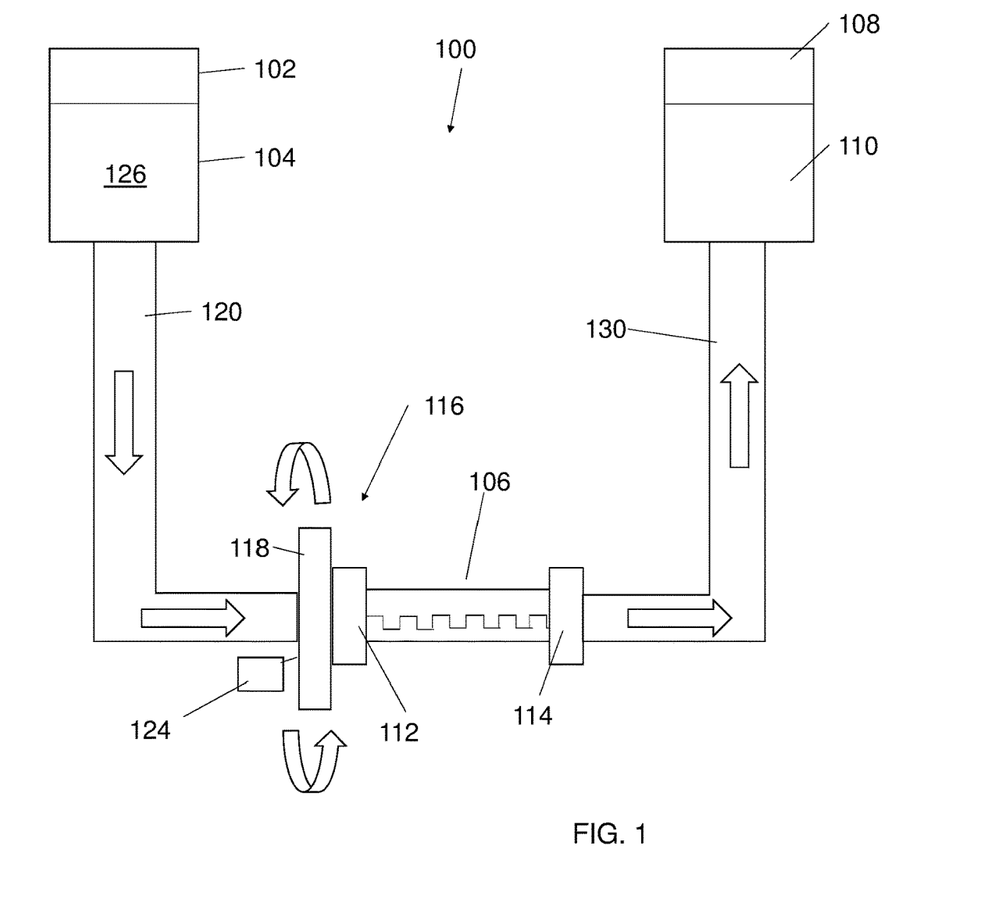
FIG. 1 is a schematic of a system for dynamically determining wettability alteration in accordance with embodiments disclosed herein.

Referring to FIG. 1, a system 100 for observing dynamic wettability alternation is shown. The system includes a fluid inlet 102 configured to receive a flow of fluid. In some embodiments, the fluid inlet 102 may be coupled to a tank or fluid container 104 for holding or storing a fluid, such as an inlet or test solution. In some embodiments, the inlet solution 126 may be a brine having a predetermined salinity and ion concentration. For example, in one or more embodiments, the total dissolved solids (TDS) of the brine is between 57,600-5,760 (ppm). The fluid inlet 102 and the fluid container 104 are in fluid communication with a microfluidic cell 106. An outlet 114 of the microfluidic cell 106 is fluidly coupled to an outlet 108 of the system 100. The outlet 108 may include a tank or fluid container 110 for holding or storing a fluid flowing from the outlet 114 of the microfluidic cell 106 through flowline 130. Between the fluid inlet 102 and an inlet 112 of the microfluidic cell 106 is a membrane filtration system 116. The membrane filtration system 116 is fluidly coupled, i.e., in fluid communication with, to the fluid inlet 112 of the microfluidic cell 106.

The membrane filtration system 116 may include at least one filter membrane. In one or more embodiments, the filter membrane is a nanofiltration membrane. Various nanofiltration membranes, such as high performance FDA-approved nanofiltration sheet membranes, are commercially available from various vendors, for example, SEPRO (Oceanside, Calif.). In accordance with embodiments disclosed herein, the membrane filtration system 116 may include two or more filter membranes that may be exchanged for each other. The different membranes may have different filtering properties or permeabilities. For example, different membranes may reduce the salinity of the inlet solution 126 by different amounts. For example, a first membrane may reduce salinity by 0%, a second membrane may reduce salinity by up to 15% and a third membrane may reduce salinity by up to 45%, and a fourth membrane may reduce salinity by 90%. The membranes may be exchanged manually or an actuation mechanism 124 may be used to move each of the membranes individually into alignment with a flowline 120 from the inlet 102 and the inlet 112 of the microfluidic cell 106 to dynamically change the salinity or ion strength or both of the fluid flowing into the microfluidic cell 106.

Figure 2:
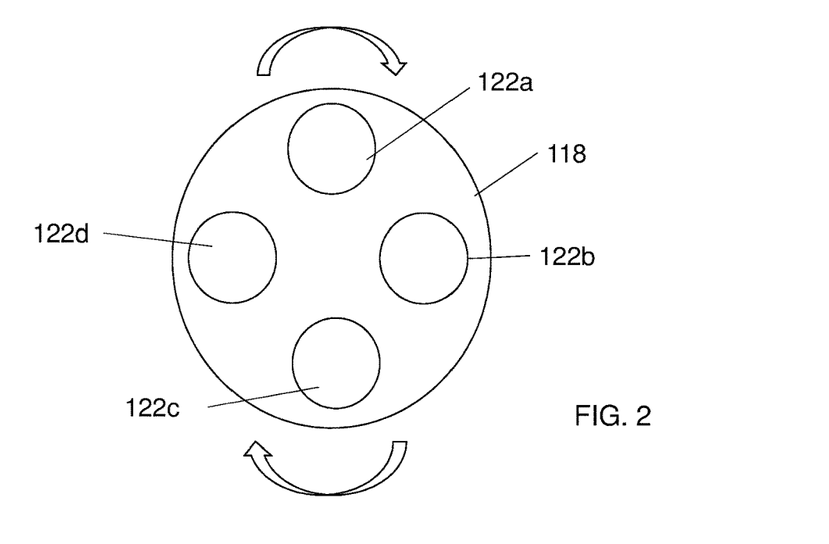
FIG. 2 is a schematic of a membrane filtration system in accordance with embodiments disclosed herein.

In one or more embodiments, the membrane filtration system 116 includes a filtration disk 118. The filtration disk 118 may be rotatably coupled to the inlet of the microfluidic cell. The filtration disk 118 may include one or more openings spaced azimuthally around the disk 118, as shown in FIG. 2. The filtration disk 118 may further include one or more filter membranes 122a-d disposed in the one or more openings spaced azimuthally around the disk 118. As noted above, in one or more embodiments, the filter membranes 122 are nanofiltration membranes. The filtration disk 118 may be positioned within the system 100, such that one membrane 122a-d is positioned in-line with the flowline 120 from the inlet 102 and the inlet 112 of the microfluidic cell 106, thereby allowing fluid flowing from the inlet, through the flowline 120 and the membrane 122, and into the microfluidic cell 106. For example, a centerline of the filtration disk 118 may be offset from a centerline of the fluid flow path or the inlet 112 of the microfluidic cell 106. Instead, a centerline of the inlet 112 of the microfluidic cell 106 or the fluid flow path may align with a radial position of the filtration disk 118 that coincides with the radial position of the centerline of the of filter membranes 122. The filtration disk 118 is configured to rotate to move a first membrane 122a out of alignment with the flowline 120 and inlet 112 of the microfluidic cell 106 and a second, third, or fourth membrane 122b, 122c, 122d into alignment with the flowline 120 and inlet 112 of the microfluidic cell 106. The filtration disk 118 of the filtration system 116 may be moved manually or by the actuation mechanism 124. In one or more embodiments, the actuation mechanism 124 may include a motor coupled to the filtration disk 118 by one or more linkages. In one or more embodiments, the motor may be actuated by a simple on/off button, while in other embodiments, the motor may be controlled by a programmable logic controller.

The filtration disk 118 may include one, two, or more filter membranes 122. As shown in FIG. 2, in one or more embodiments, the filtration disk 118 may include four filter membranes 122a-d disposed azimuthally around the disk with an equal spacing between each filter membrane. As discussed above, each filtration membrane 122a-d may provide a different filtration or permeability than each of the other filtration membranes. For example, a first membrane 122a may provide 0% salinity reduction, a second membrane 122b may provide a 15% salinity reduction of the inlet solution 126 as it flows through the second membrane 122b, a third membrane 122c may provide a 45% salinity reduction, and a fourth membrane 122d may provide a 90% salinity reduction. One of ordinary skill in the art will appreciate that while a certain number of membranes and filtration levels (salinity reduction) has been provided, a different number of membranes and a different filtration may be used without departing from the scope of the present application. For example, a filtration disk 118 may include two membranes, three membranes, or more than four membranes. Further, in one or more embodiments, a first membrane may provide 0% salinity reduction, a second membrane may provide 30% salinity reduction, and a third membrane may provide 60% salinity reduction.

Referring to FIGS. 1 and 2 together, in a first position of the filtration disk 118, the first membrane 122a having providing a 0% salinity reduction may be positioned in the in-line with the inlet 102 of the system 100 and the inlet 112 of the microfluidic cell 106, such that the first membrane 122a is fluidly aligned with the fluid flow path (indicated by arrows) through the flowline 120 and the inlet 112 of the microfluidic cell 106. Thus, the inlet solution 126, for example a brine having a predetermined salinity and ion strength, flows from the inlet 102, through the first membrane 122a and into the microfluidic cell 106 without reduction of salinity or ion strength. Thus, a first permeate flowing through the first membrane 122a has a first salinity and a first ion concentration that are the same as the salinity and ion concentration of the inlet solution 126. As the first permeate flows through the microfluidic cell 106, the wettability of the surface of the microfluidic cell 106 with the first permeate (in this example, the inlet solution) may be observed. For example, the wettability of a calcite coated surface of the microfluidic cell 106 with the first permeate may be observed.

The salinity or ion strength or both of the inlet solution may be dynamically changed before or as the fluid enters the microfluidic cell 106 by adjusting the filtration disk 118. For example, the filtration disk 118 may be rotated by manual, mechanical, or electro-mechanical means to a second position to move the first membrane 122a out of alignment with the fluid flow path through the flowline 120 and the inlet 112 of the microfluidic cell 106 and to move a second membrane 122b into the fluid flow path. Fluid flowing through the second membrane 122b will provide a second permeate having a second salinity and a second ion concentration. In embodiments where the second membrane 122b has a different permeability than the first membrane, then the second salinity, second ion concentration, or both of the second permeate are different than the first salinity and first ion concentration of the first permeate. As the second permeate flows through the microfluidic cell 106, the wettability of the surface of the microfluidic cell 106 with the second permeate having a second salinity or second ion concentration different than the first salinity and first ion concentration of the first permeate may be observed. By observing changes in the wettability of the surfaces of the microfluidic cell 106 as the salinity or ion concentration of the fluid flowing through the inlet of the microfluidic cell 106 is dynamically changed by the filtration system 116, the wettability alteration may be observed and determined.

The salinity, ion strength, or both of the inlet solution may by dynamically changed again by further adjusting the filtration disk 118 to move the second membrane 122b out of alignment with the fluid flow path and the third membrane 122c into alignment with the fluid flow path through the flowline 120 and the inlet 112 of the microfluidic cell 106. In one or more embodiments, the third membrane 122c may have a different permeability than the first and second membranes 122a,b, or it may have the same permeability as the first or second membranes 122a,b. Fluid flowing through the third membrane 122c will provide a third permeate having a third salinity and a third ion concentration. In embodiments where the third membrane 122c has a different permeability than the first membrane, then the third salinity, third ion concentration, or both of the third permeate are different than the second salinity and second ion concentration of the second permeate. The third salinity, third ion concentration, or both of the third permeate may be the same or different than the first salinity or first ion concentration of the first permeate or the inlet solution. As the third permeate flows through the microfluidic cell 106, the wettability of the surface of the microfluidic cell 106 with the third permeate having a third salinity or third ion concentration may be observed. By observing changes in the wettability of the surfaces of the microfluidic cell 106 as the salinity or ion concentration of the fluid flowing through the inlet of the microfluidic cell 106 is dynamically changed by various filter membranes 122 of the filtration system 116, the wettability alteration may be observed and determined.

In some embodiments, the filtration disk 118 may be rotated to different positions to sequentially move from one membrane to a subsequent membrane (e.g., from the first membrane 122a to the second membrane 122b) while in other embodiments, the membranes may be selected such that the first membrane 122a may be changed to the third membrane 122c or another membrane of the filtration system 116.

Embodiments disclosed herein, therefore, provide a system 100 that dynamically adjusts the salinity and ionic strength of the inlet solution 126 in situ prior to or as the inlet solution is introduced into the microfluidic cell 106 The salinity or ionic strength of the testing fluid (i.e., the inlet solution) held in reserve in the fluid container 104 is not modified. Rather, the nanofiltration membranes 122 of the filtration system 116 dynamically adjust the salinity or ionic strength of the fluid entering the microfluidic cell 106. By dynamically adjusting the salinity of the fluid entering the microfluidic cell 106, the effect of salinity or ion strength on wettability alteration may be determined and monitored.

Figure 3:
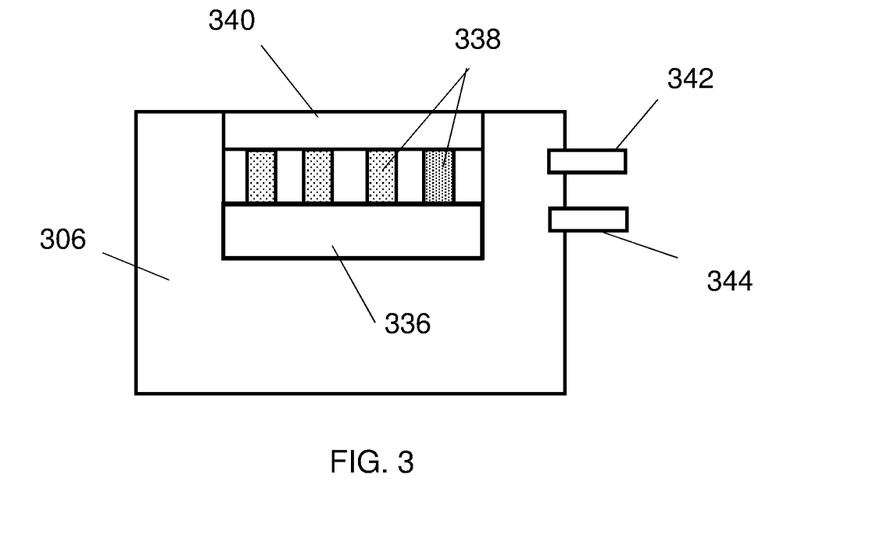
FIG. 3 is a cross-sectional view of a schematic of a microfluidic cell in accordance with embodiments disclosed herein.
Figure 4:
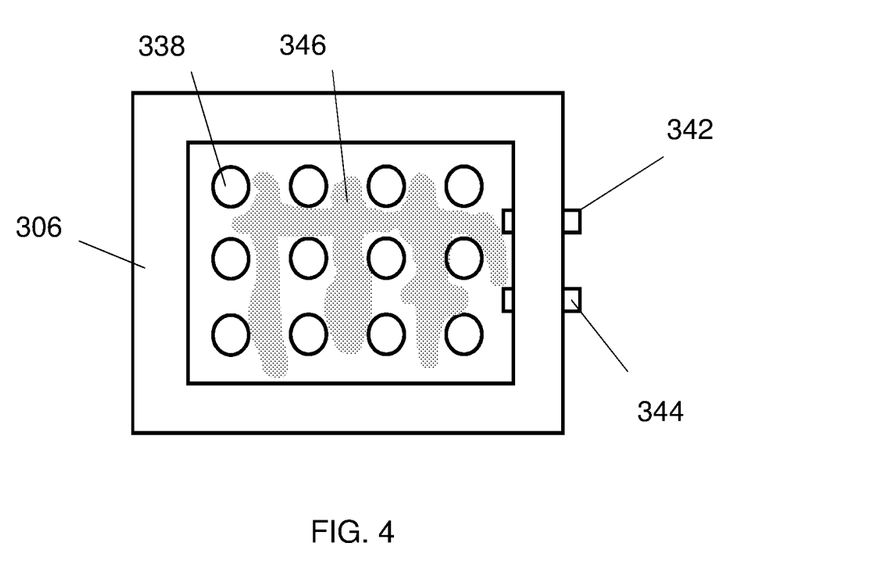
FIG. 4 is a top view of the schematic of the microfluidic cell of FIG. 3 in accordance with embodiments disclosed herein.

In accordance with embodiments disclosed herein, system 100 may include a commercially available microfluidic cell or a microfluidic cell customized, for example, to determine a wettability alteration of a fluid with a particular rock or surface having specific properties. FIGS. 3 and 4 show an example of a customized fluidic cell that may be used in system 100 in accordance with one or more embodiments. As shown, microfluidic cell 306 includes a glass surface 336 having a patterned surface 338 to provide microfluidic channels. As discussed above, the patterned surface 338 may include vertical posts. Additionally, the microfluidic channels of the patterned surface 338 may be provided by altering the microfluidic channels of the cell by in situ growth of a thin layer (1-2 μm) of calcium carbonate ($CaCO_3$) nanocrystals, thereby providing a calcite coated microfluidic cell 306. The microfluidic cell 306 includes a transparent window 340 to allow for direct visualization of pore-scale fluid flow through the microfluidic cell 306. An inlet flow line 342 and an outlet flow line 344 are coupled to the microfluidic cell 306 to provide fluid flow 346 of, for example, a brine or permeate, into the microfluidic cell 306 from the membrane filtration system 116 (FIG. 1) and out of the microfluidic cell 306 to the outlet 108 (FIG. 1) of the system 100 (FIG. 1), respectively.

Figure 5:
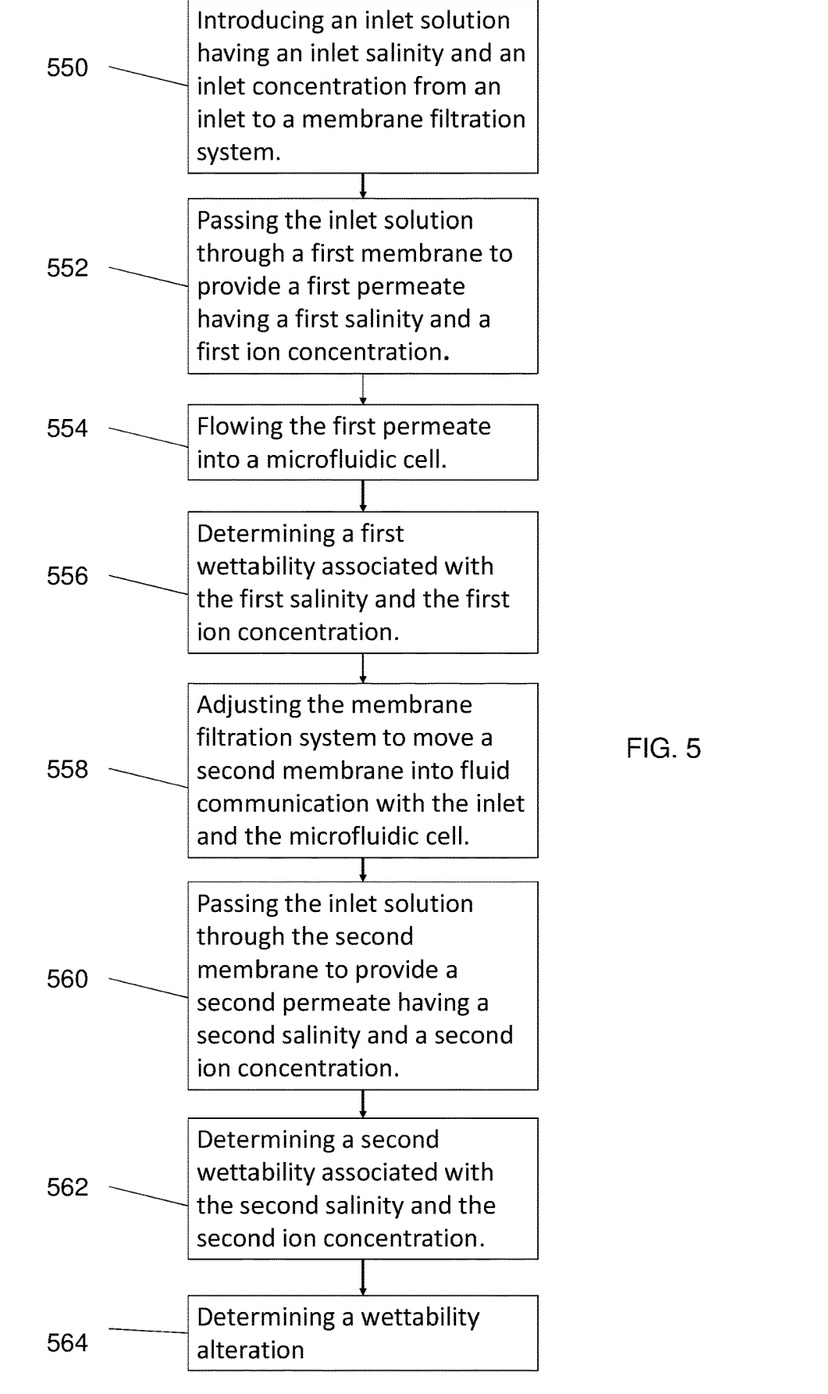
FIG. 5 is a flow chart of a method for dynamically determining wettability alteration in accordance with embodiments disclosed herein.

In one or more embodiments, a method is provided that allows for simultaneous control of the concentration or ion strength of a test fluid and measurement or observation of wettability or wettability alteration. FIG. 5 shows a method in accordance with embodiments disclosed herein is shown. As shown, the method includes introducing an inlet solution 126 having an inlet salinity, $S_i$, and an inlet concentration, $C_i$, from an inlet 102 of a system 100 to a membrane filtration system 116, as shown at 550. The inlet solution 126 passes through a first membrane 122a of the membrane filtration system 116 to provide a first permeate having a first salinity, $S_1$, and a first ion concentration, $C_1$, as shown at 552. The first permeate flows into a microfluidic cell 106, as shown at 554. A first wettability associated with the first salinity, $S_1$, and the first ion concentration, C1, is determined, as shown at 556. One of ordinary skill in the art will appreciate that the wettability may be determined by observing the fluid/solid contact within a microfluidic cell and/or determining a contact angle of a fluid with a surface.

The method further includes adjusting the membrane filtration system 116 to move a second membrane 112b into fluid communication with the inlet 102 and the microfluidic cell 106, as shown at 558. In other words, the first membrane 122a is moved out of alignment with the fluid flow path through the flowline 120 and the inlet 112 of the microfluidic cell 106 and the second membrane 122b is moved into alignment with the fluid flow path through the flowline 120 and the inlet 112 of the microfluidic cell 106. In one or more embodiments, the membrane filtration system includes a filtration disk 118 coupled to an inlet of the microfluidic cell. The filtration disk 118 may include the first membrane 122a and the second membrane 122b, as described above with reference to FIG. 2. The filtration disk 118 may also include more than two filter membranes as described above. In one or more embodiments, adjusting the membrane filtration system 116 includes rotating the filtration disk 118 to different positions to move a particular filter membrane, such as second membrane 122b, into alignment with the fluid flow path. The filtration disk 118 may be rotated by manual, mechanical, or electro-mechanical means.

With the second membrane 122b moved into alignment with the fluid flow path, the inlet solution passes through the second membrane 122b of the membrane filtration system 116 to provide a second permeate having a second salinity, $S_2$, and a second ion concentration $C_2$, as shown at 560. In one or more embodiments, the second salinity is different from the first salinity or the second ion concentration is different from the first ion concentration. The difference in salinity or ion concentration between the first and second permeates is attributed to a difference in the first and second membranes 122a,b. Specifically, the first membrane 122a and the second membrane 122b may have different characteristics or permeabilities such that the permeates resulting from the filter membranes have different ion concentrations or different saline contents. The number of filter membranes and the types of membranes may be selected to target specific ions for filtering and to provide a permeate with a specific ion concentration or salinity. While embodiments discussed herein describe a filtration system and filter membranes for targeting salinity, in one or more embodiments the filter membrane(s) for the filtration system may be selected so as to target other concentrations of materials from the inlet solution, such as, for example, magnesium, calcium, and sulfate. Table 1 below provides an example of filter membranes used to provide a permeate with a specific salinity.

TABLE 1

Example Membranes for Membrane Filtration System

| Membrane | Water Flux | NaCl Rejection (%) |
|---|---|---|
| Nanofiltration Membrane 1 | 65 gfd (110 Lmh) | 90 |
| Nanofiltration Membrane 2 | 40 gfd (128 Lmh) | 45 |
| Nanofiltration Membrane 3 | 85 gfd (145 Lmh) | 15 |

A second wettability associated with the second salinity, $S_2$, and the second ion concentration, $C_2$ is determined, as shown at 562. One of ordinary skill in the art will appreciate that the wettability may be determined by observing the fluid/solid contact within a microfluidic cell and/or determining a contact angle of a fluid with a surface. Based on the first wettability and the second wettability, a wettability alteration may be observed and determined. In one or more embodiments, determining a first wettability may include observing a flow of a first permeate through a pattern formed on a surface of the microfluidic cell, and determining a second wettability may include observing a flow of a second permeate through the pattern formed on the surface of the microfluidic cell. Determining a wettability alteration, as shown at 564, may include comparing the flow of the first permeate through the pattern formed on the surface of the microfluidic cell with the flow of the second permeate through the pattern formed on the surface of the microfluidic cell.

In one or more embodiments, determining wettability alteration may include providing a charge-coupled device (CCD) camera (not shown) proximate the microfluidic cell to capture images of an interaction between crude oil and the pattern on the surface of the microfluidic cell. For example, the CCD camera may be installed above the microfluidic cell and capture images of the interaction between crude oil and a pattern of calcite coated channels within the microfluidic cell. The captured images are used to then measure a contact angle between the crude oil and the patterned surface (e.g., calcite surface). The measured contact angle between the crude oil and the patterned surface may then be used as a parameter to determine wettability alteration of other solutions or fluids, such as a brine or permeate described above. For example, the CCD camera may be used to capture images of the interaction between a permeate, as described above, and the patterned surface of the microfluidic cell. The capture images are then used to measure a contact angle between the permeate and the patterned surface (e.g., calcite surface) of the microfluidic cell. The contact angles of the crude of/patterned surface and the permeate/patterned surface may then be compared to determine wettability alteration.

In one or more embodiments, the membrane filtration system 116 may be further adjusted one or more times to move a third, fourth, or subsequent filter membranes 122 into alignment with the flow path through the flowline 120 and the inlet 112 of the microfluidic cell 106. Each of the third, fourth, or subsequent filter membranes 122 may have different characteristics such that certain ions may be targeted to provide a specific, predetermined ion concentration or salinity. Thus, steps 558, 560, 562, and 564 may be repeated to observe, determine, and/or monitor wettability alteration of the surface of the microfluidic cell under dynamic conditions as different permeates having different salinity or ion strength pass therethrough.

In accordance with one or more embodiments, a method for dynamically determining wettability alteration may include flowing an inlet solution having an inlet salinity and an inlet ion concentration from an inlet to a membrane filtration system, dynamically adjusting the salinity or ion concentration of the inlet solution in situ as the inlet solution flows to an inlet of a microfluidic cell, and determining a wettability alteration in situ while dynamically adjusting the salinity or ion concentration of the inlet solution.

The salinity or ion concentration of the inlet solution may be dynamically adjusted by flowing the inlet solution through a first membrane of the membrane filtration system to provide a first permeate having a first salinity and a first ion concentration to the inlet of the microfluidic cell. As described above, the first membrane may be removed from a fluid flow path between the inlet and the microfluidic cell, and a second membrane may be moved into the fluid flow path between the inlet and the microfluidic cell. The inlet solution is then flowed through the second membrane of the membrane filtration system to provide a second permeate to the inlet of the microfluidic cell. A filtration disk having the first membrane disposed in a first opening and the second membrane disposed in a second opening spaced azimuthally around the disk a distance from the first opening may be rotated to align the first membrane, the second membrane, or other membranes, with the fluid flow path between the inlet and the microfluidic cell. The membranes may be nanofiltration membranes commercially available as described above to target specific ions or to provide specific concentrations. The salinity or the ion concentration of permeates provided by different filter membranes may be different so that the salinity or ion concentration of the inlet solution may be modified by changing the membranes disposed in the fluid flow path of the system.

The permeates that flow through a membrane of the membrane filtration system flow through the inlet of the microfluidic cell and through a patterned surface of the microfluidic cell. As described above, the microfluidic cell may be calcite coated in one or more embodiments. A wettability of the surface of microfluidic cell may be determined as a first permeate flows through the microfluidic cell. A wettability of the surface of the microfluidic cell may be determined as a second permeate flows through the microfluidic cell. The wettability alteration may then be determined by comparing the wettability of the surface with the first permeate to the wettability of the surface with the second permeate.

A system or method in accordance with embodiments disclosed herein may advantageously allow for determination of wettability alteration under dynamic fluid changes in situ. Embodiments disclosed herein may also provide for the effect of salinity or ion strength on wettability alteration to be determined and monitored. A system or method in accordance with embodiments disclosed herein may provide for a reduced experiment time because the testing or inlet solution (e.g., brine) does not need to be changed for each wettability test. Specific ions or concentrations may be targeted within a single test based on the number and type of filter membranes included in the filtration system in accordance with embodiments disclosed herein. Thus, embodiments disclosed herein may provide simultaneous control or adjustment of salinity or ion strength in a test fluid and measurement of wettability or wettability alteration of a reservoir rock.

While the method and apparatus have been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:
1. A method comprising:
introducing an inlet solution having an inlet salinity and an inlet ion concentration from a system inlet to a membrane filtration system;
passing the inlet solution through a first membrane of the membrane filtration system to provide a first permeate having a first salinity and a first ion concentration;
flowing the first permeate into a microfluidic cell;
determining a first wettability of a surface of the microfluidic cell associated with the first salinity and the first ion concentration;
adjusting the membrane filtration system, the adjusting comprising moving a second membrane into fluid communication with the system inlet and the microfluidic cell while the inlet solution is being flowed through the membrane filtration system;
passing the inlet solution through the second membrane of the membrane filtration system to provide a second permeate having a second salinity and a second ion concentration, wherein the second salinity is different from the first salinity or the second ion concentration is different from the first ion concentration;
determining a second wettability of a surface of the microfluidic cell associated with the second salinity and the second ion concentration; and
determining a wettability alteration based on the first wettability and the second wettability.

2. The method of claim 1, wherein the adjusting the membrane filtration system comprises rotating a filtration disk coupled to an inlet of the microfluidic cell.

3. The method of claim 1, further comprising:
adjusting the membrane filtration system to move a third membrane into fluid communication with the system inlet and the microfluidic cell;
passing the inlet solution through the third membrane of the membrane filtration system to provide a third permeate having a third salinity and a third ion concentration, wherein the third salinity is different from the second salinity or the third ion concentration is different from the second ion concentration;
determining a third wettability associated with the third salinity and the third ion concentration; and
determining a wettability alteration based on the first wettability, the second wettability, and the third wettability.

4. The method of claim 1, wherein the first salinity of the first permeate is the same as the inlet salinity of the inlet solution.

5. The method of claim 1, wherein the determining a first wettability comprises observing a flow of the first permeate through a pattern formed on the surface of the microfluidic cell; and
wherein determining a second wettability comprises observing a flow of the second permeate through the pattern formed on the surface of the microfluidic cell.

6. The method claim 5, wherein the determining a wettability alteration comprises comparing the flow of the first permeate through the pattern formed on the surface of the microfluidic cell with the flow of the second permeate through the pattern formed on the surface of the microfluidic cell.

7. The method of claim 5, wherein the pattern formed on the surface of the microfluidic cell is coated with calcite.

8. A method comprising:
flowing an inlet solution having an inlet salinity and an inlet ion concentration from a system inlet to a membrane filtration system;
dynamically adjusting the inlet salinity or inlet ion concentration of the inlet solution in situ as the inlet solution flows to an inlet of a microfluidic cell; and
determining a wettability alteration in situ while dynamically adjusting the inlet salinity or inlet ion concentration of the inlet solution.

9. The method of claim 8, wherein the dynamically adjusting the inlet salinity or inlet ion concentration of the inlet solution comprises:
flowing the inlet solution through a first membrane of the membrane filtration system to provide a first permeate having a first salinity and a first ion concentration to the inlet of the microfluidic cell.

10. The method of claim 9, wherein the dynamically adjusting the inlet salinity or inlet ion concentration of the inlet solution further comprises:
removing the first membrane from a fluid flow path between the system inlet and the microfluidic cell;
moving a second membrane into the fluid flow path between the system inlet and the microfluidic cell; and
flowing the inlet solution through the second membrane of the membrane filtration system to provide a second permeate to the inlet of the microfluidic cell.

11. The method of claim 10, wherein the second permeate has a second salinity different from the first salinity of the first permeate or a second ion concentration different from the first ion concentration of the first permeate.

12. The method of claim 10, wherein the removing the first membrane from a fluid flow path, and moving a second membrane into the fluid flow path are provided by rotating a filtration disk having the first membrane disposed in a first opening and the second membrane disposed in a second opening spaced azimuthally around the filtration disk a distance from the first opening.

13. The method of claim 10, further comprising determining a wettability of a calcite coated patterned surface of the microfluidic cell as the first permeate passes through the microfluidic cell to an outlet.

14. The method of claim 13, further comprising determining a wettability of a calcite coated patterned surface of the microfluidic cell as the second permeate passes through the microfluidic cell to the outlet.

15. The method of claim 14, wherein the determining the wettability alteration comprises comparing the wettability of the calcite coated patterned surface with the first permeate to the wettability of the calcite coated patterned surface with the second permeate.

16. A system comprising:
a fluid inlet;
a microfluidic cell fluidly coupled to the fluid inlet, the microfluidic cell comprising a transparent surface having a patterned surface representative of a reservoir rock; and
a membrane filtration system coupled between the microfluidic cell and the fluid inlet, the membrane filtration system comprising:
at least two nanofiltration membranes that are interchangeably aligned between the fluid inlet of the system and an inlet of the microfluidic cell; and
an actuation mechanism that moves at least one of the at least two filter membranes into a position in-line between the fluid inlet of the system and the inlet of the microfluidic cell.

17. The system of claim 16, wherein the at least two nanofiltration membranes have different permeabilities.

18. The system of claim 17, wherein the membrane filtration system comprises a rotatable disk having the at least two nanofiltration membranes having different permeabilities spaced azimuthally around the rotatable disk a distance from each other, wherein in a first position a first of the at least two nanofiltration membranes of the rotatable disk is aligned with a fluid flow path between the fluid inlet and the inlet of the microfluidic cell, and in a second position a second membrane of the at least two nanofiltration membranes is aligned with a fluid flow path between the fluid inlet and the inlet of the microfluidic cell.

19. The system of claim 16, wherein the surface representative of a reservoir rock of the microfluidic cell comprises a calcite coated surface.

20. They system of claim 16, wherein the transparent surface of the microfluidic cell is patterned with vertical posts.

* * * * *